United States Patent [19]

Shibata et al.

[11] Patent Number: 4,908,560
[45] Date of Patent: Mar. 13, 1990

[54] VEHICLE CORNERING LAMP SYSTEM

[75] Inventors: Hiroki Shibata; Kazuki Takahashi; Keiichi Tajima; Takashi Kurita; Kiyoshi Wada; Kiyoshi Yamashita, all of Shizuoka, Japan

[73] Assignee: Koito Manufacturing Co., Ltd., Tokyo, Japan

[21] Appl. No.: 241,448

[22] Filed: Sep. 8, 1988

[30] Foreign Application Priority Data

Sep. 8, 1987 [JP] Japan .................. 62-223067

[51] Int. Cl.$^4$ ............................ B60Q 1/12
[52] U.S. Cl. .................. 318/603; 362/44; 362/71; 307/10.8
[58] Field of Search .......... 318/603, 436; 362/37, 362/40, 41, 42, 43, 44, 45, 46, 66, 71; 307/10.8

[56] References Cited

U.S. PATENT DOCUMENTS

| 4,276,581 | 6/1981 | Orii et al. | 362/40 |
| 4,663,696 | 5/1987 | Miyazawa et al. | 362/80 |
| 4,733,333 | 3/1988 | Shibata et al. | 362/40 |
| 4,766,359 | 8/1988 | Smith et al. | 318/603 X |

FOREIGN PATENT DOCUMENTS

| 0077855 | 5/1983 | European Pat. Off. | 318/603 |
| 2450777 | 4/1976 | Fed. Rep. of Germany | 362/44 |
| 57-37037 | 3/1982 | Japan | 362/37 |
| 60-78838 | 5/1985 | Japan | 362/71 |
| 60-241785 | 11/1985 | Japan | 318/603 |
| 61-207243 | 9/1986 | Japan | 362/37 |
| 61-222837 | 10/1986 | Japan | 362/40 |
| 0924816 | 5/1982 | U.S.S.R. | 318/603 |

Primary Examiner—Bentsu Ro
Attorney, Agent, or Firm—Sughrue, Mion, Zinn, Macpeak & Seas

[57] ABSTRACT

In a vehicle cornering lamp system, a control signal having a pulse width corresponding to a steering angle is periodically produced, and the amount of position shift between the actual direction of illumination of the headlamps and the target direction of illumination determined from the steering angle is detected according to the control signal thus produced. An electric motor is driven to change the direction of illumination of the headlamps so that the amount of position shift becomes zero, that is, the direction of illumination of the headlamps is linearly changed with the electric motor while following the steering angle.

3 Claims, 3 Drawing Sheets

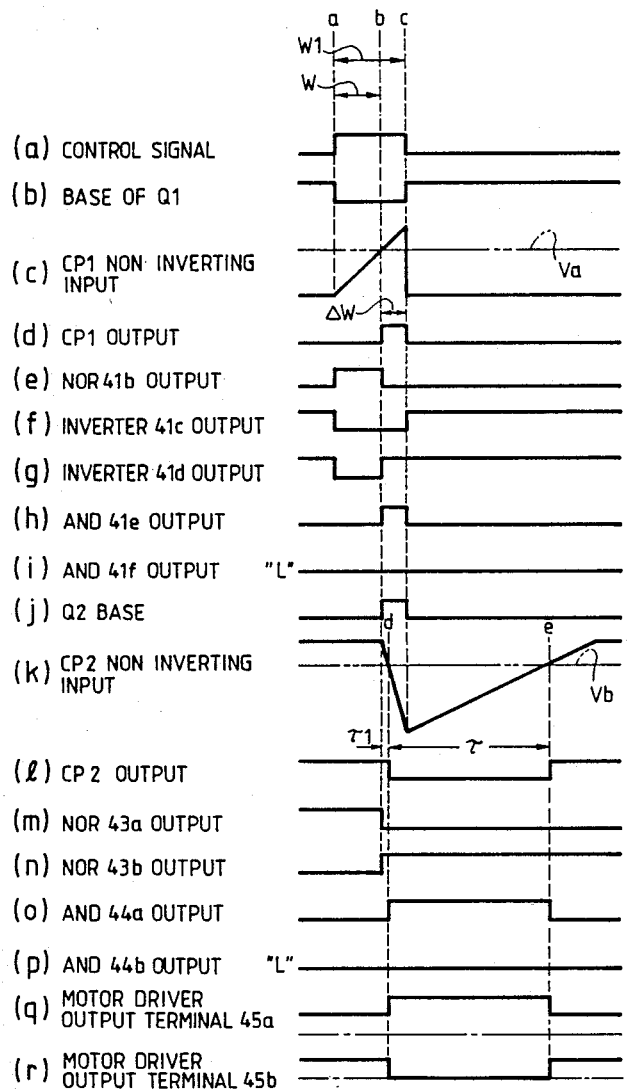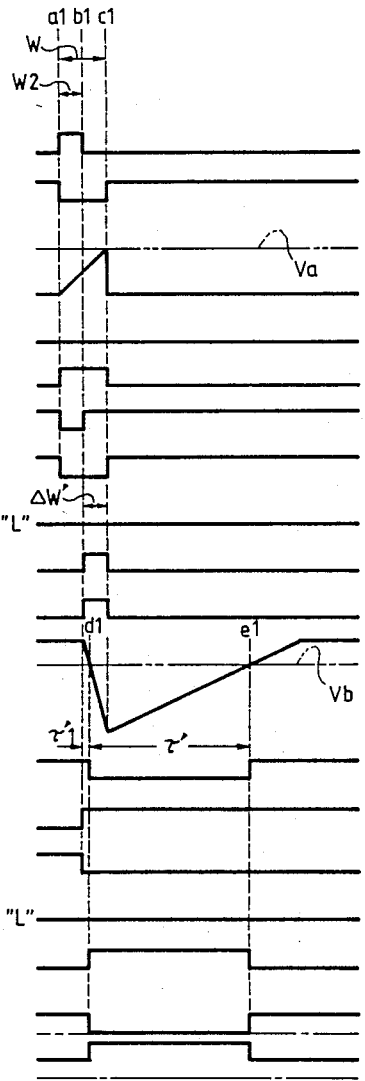

VEHICLE CORNERING LAMP SYSTEM

BACKGROUND OF THE INVENTION

The present invention relates to a vehicle cornering lamp system in which the direction of illumination of headlamps is changed as the steering wheel of the vehicle is turned.

The direction of illumination of automotive headlamps is usually fixed so that light is applied to objects located directly ahead of the vehicle. When, however, the vehicle travels around a curve, such headlamps cannot sufficiently illuminate objects located in the actual path of the vehicle. That is, during travel on curved roads and in cornering, objects located in the path of the vehicle may not sufficiently be illuminated by the headlamps.

In order to overcome this difficulty, recently a cornering lamp system has been proposed in which the direction of illumination of a headlamp is changed as the steering wheel is turned so that objects located in the path of the vehicle are sufficiently illuminated.

The conventional cornering lamp system is generally a mechanical cornering lamp system in which a steering wheel operating mechanism and a direction-of-illumination changing mechanism are mechanically coupled to each other so that the direction of illumination of the headlamp is linearly changed so as to track the steering angle. Such a system is unavoidably intricate in arrangement, and suffers from the difficulty that a different design is required for each type of vehicle with which the system is to be employed, that is, different cornering lamp systems must be provided for different types of vehicles. Furthermore, since the steering wheel operating mechanism and the direction-of-illumination changing mechanism are mechanically coupled to each other, the operation of changing the direction of illumination is carried out even in the daytime, which reduces the service of the system.

SUMMARY OF THE INVENTION

Accordingly, an object of the present invention is to eliminate the above-described difficulties accompanying a conventional vehicle cornering lamp system.

The foregoing object and other objects of the invention have been achieved by the provision of a vehicle cornering lamp system in which the direction of illumination of lamp means is changed in association with a steering-wheel turning operation, which cornering lamp system, according to the invention, comprises: control signal generating means for periodically generating a control signal having a pulse width corresponding to a steering angle; position shift detecting means for detecting an amount of position shift between an actual direction of illumination of the lamp means and a target direction of illumination determined from the steering angle, with the detecting operation be carried out in accordance with the control signal provided by the control signal generating means; and direction-of-illumination changing means for driving an electric motor to change the direction of illumination of the lamp means so that the amount of position shift becomes zero.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a timing chart for a description of the operation of the cornering lamp system in the case where the steering wheel is turned clockwise from the straight-ahead steering position;

FIG. 7 is a timing chart for a description of the operation of the cornering lamp system in the case where the steering wheel is turned counterclockwise from the straight-ahead steering position.

DESCRIPTION OF THE PREFERRED EMBODIMENTS

An example of a vehicle cornering lamp system constructed according to the invention will be described in detail with reference to FIG. 1.

Figure 1:
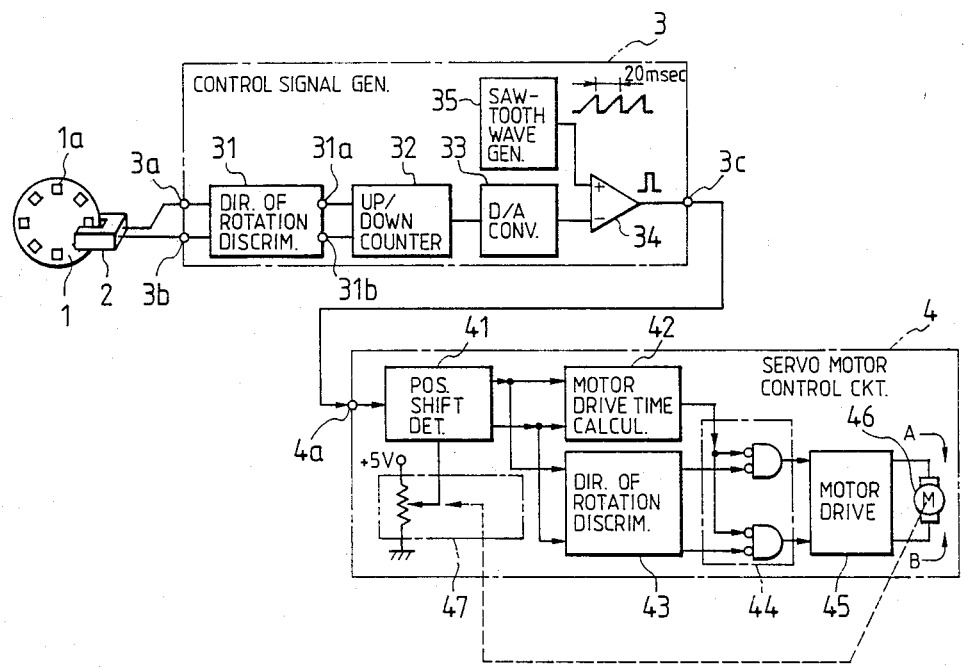
FIG. 1 is an explanatory diagram, partly as a block diagram, showing the arrangement of an example of a vehicle cornering lamp system constructed according to this invention.

In FIG. 1, reference numeral 1 designates a rotary disc which rotates as the steering wheel is turned, and 2 is a photosensor composed of two pairs of light-emitting elements and light-detecting elements (not shown). The rotary disc 1 turns clockwise when the steering wheel is turned clockwise, and it is turned counterclockwise when the steering wheel is turned counterclockwise. A number of slits 1a, which are the same in configuration, are formed in the peripheral portion of the rotary disc 1 at equal angular intervals. The photosensor 2 is positioned so that the light-emitting elements confront the light-detecting elements through the slits 1a. One of the two pairs of light-emitting elements and light-detecting elements forms a first photo-interrupter, and the other a second photo-interrupters, with the first and second photo-interrupters being juxtaposed in the photosensor 2.

As the rotary disc 1 is turned clockwise or counterclockwise, the slits 1a pass through the photosensor 2 so that pulsed electrical signals which are equal in waveform and are shifted about 90° in phase are generated by the first and second photo-interrupters. The electrical signals thus generated are applied through terminals 3a and 3b to a direction-of-rotation discriminating circuit 31 in a control signal generating circuit 3.

According to the phases of the pulse-shaped electrical signals inputted through the terminals 3a and 3b, the direction-of-rotation discriminating circuit 31 detects the direction of rotation of the rotary disc 1, i.e., the direction of rotation of the steering wheel, and outputs up signals or down signals, the number of pulses of which corresponds to the amount of clockwise or counterclockwise rotation of the steering wheel. The up signals and down signals provided respectively at the output terminals 31a and 31b of the direction-of-rotation discriminating circuit 31 are applied to an up/down counter 32. In the up/down counter 31, the count value is increased or decreased in correspondence to the number of up- or down-signal pulses applied thereto. As a result, a voltage corresponding to the count value of the up/down counter 32 is applied through a D/A converter 33 to the inverting (−). input terminal of a comparator 34, to the noninverting (+) input terminal of which a sawtooth-shaped reference voltage having a period of 20 msec is applied by a sawtooth wave generator 35.

The voltage applied through the D/A converter 33 to the inverting input terminal of the comparator 34 is scaled so that, when the count value of the up/down counter 32 is zero, i.e., when the steering wheel is at the straight-ahead steering position, it is at the middle of the vertical width of the sawtooth reference voltage applied to the noninverting input terminal of the comparator 34 by the sawtooth wave generator 35. In this case, the control signal outputted by the comparator 34 is a periodic pulse signal having a 50% duty ratio. On the other hand, as the count value of the up/down counter 32 is increased or decreased, the voltage applied to the inverting input terminal of the comparator 34 by the D/A converter 33 is decreased or increased according to the count value thus increased or decreased. That is, when the steering wheel is turned clockwise or counterclockwise from the straight-ahead steering position, the duty ratio of the control signal outputted by the comparator 34 increases or decreases from 50%. In other words, the pulse width of the control signal outputted periodically by the comparator 34 is changed with the steering angle of the steering wheel—it is increased when the steering wheel is turned clockwise, and it is decreased when the steering wheel is turned counterclockwise. The control signal provided at the output terminal of the comparator 34 (i.e., at the output terminal 3c of the control signal generating circuit 3) is applied to the input terminal 4a of a servo motor control circuit 4.

The servo motor control circuit 4, as shown in FIG. 1. includes a position shift detecting circuit 41 which receives the control signal through the input terminal 4a, a motor drive time calculating circuit 42 and a direction-of-rotation discriminating circuit 43 which receive the outputs of the position shift detecting circuit 41, an AND gate circuit 44 which receives the outputs of the motor drive time calculating circuit 42 and the direction-of-rotation discriminating circuit 43, a motor diver for driving an electric motor 46 according to the output of the AND gate circuit 44, and, a potentiometer 47 whose output voltage changes with the angular position of rotation of the electric motor 46.

Figure 2:
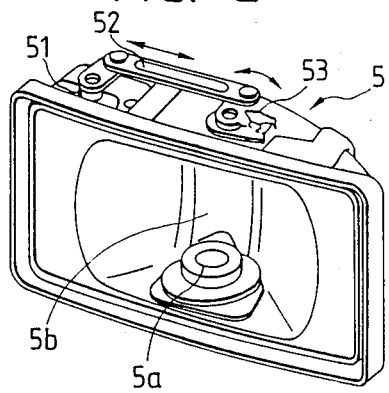
FIG. 2 is an external perspective view of a headlamp whose direction of illumination is changed by the vehicle cornering lamp system.

The direction of illumination of a headlamp (FIG. 2) is set by the electric motor 46 controlled by the servo motor control circuit 4. This will be described in more detail. When current is applied to the electric motor in the direction of the arrow A in FIG. 1, the output shaft 46a (FIG. 3) of the motor is turned clockwise. As a result, the torque of the motor is applied through a crown gear 46b and a worm gear 46c to a sub-reflector 5b rotatably provided behind a lamp 5a (FIG. 2) to turn the sub-reflector 5b so that the direction of illumination of the headlamp 5 is changed to the right as viewed by the operator. When current is applied to the electric motor in the direction of the arrow B (FIG. 1), the torque of the motor is applied through the crown gear 46b and the worm gear 46c to the sub-reflector 5b so that the direction of illumination of the headlamp 5 is changed to the left as viewed by the operator.

Figure 3:
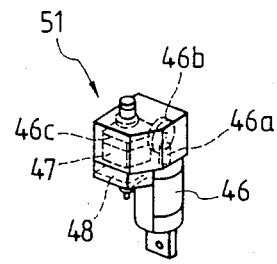
FIG. 3 is a perspective view showing a speed reduction drive mechanism coupled to an electric motor in the cornering lamp system.

The crown gear 56b and the worm gear 46c coupled mechanically to the output shaft 46a of the electric motor 46 form a speed reduction drive mechanism 51. The speed reduction drive mechanism 51 is built into the headlamp 5 on the rear side. The torque of the speed reduction drive mechanism 51 is transmitted through a link 52 to the sub-reflector 5b to swing the latter to the right or to the left. When the electric motor 46 is not operated, a zeroing mechanism 53 operates to forcibly return the sub-reflector 5b to the central position of the swing so that the line of illumination of the headlamp is fixed forwardly of the vehicle. The speed reduction drive mechanism 51 is coupled to the potentiometer 47. A servo motor control board 48 on which the above-described position shift detection circuit 41, motor drive time calculating circuit 42, direction-of-rotation discriminating circuit 43, AND gate circuit 44 and motor driver 45 are formed is provided below the potentiometer 47, as shown in FIG. 3.

Figure 4:
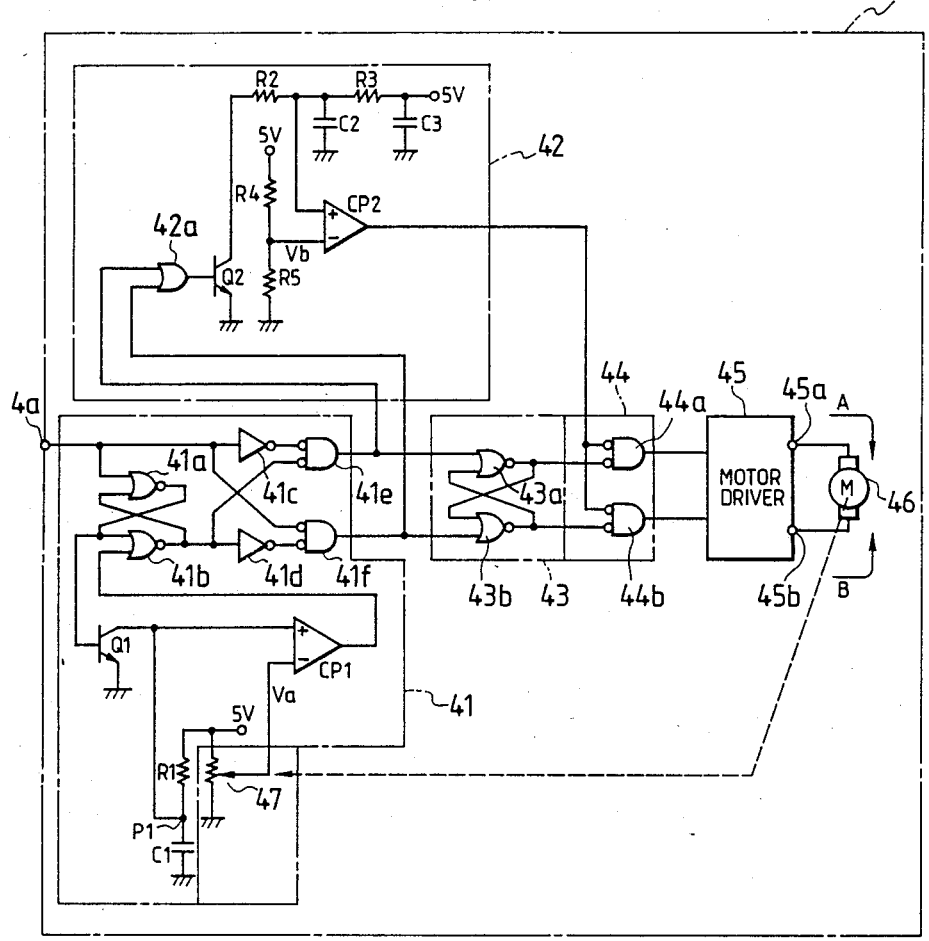
FIG. 4 is a circuit diagram, partly as a block diagram, showing a servo motor control circuit in the cornering lamp system in detail.

The arrangement of the position shift detecting circuit 41, the motor drive time calculating circuit 42, and the direction-of-rotation discriminating circuit 43 in the servo motor control circuit 4 are shown in FIG. 4 in more detail.

That is, the position shift detecting circuit 41 includes NOR gates 41a and 41b, inverters 41c and 41d, inverting input AND gates 41e and 41f, and NPN transistor Q1, a comparator CP1, a resistor R1 and a capacitor Cl. The potential at the connecting point Pl of the collector of the transistor Q1, the resistor R1 and the capacitor Cl is applied to the noninverting input terminal of the comparator CP1, and the output voltage Va of the potentiometer 47 is applied to the inverting input terminal of the comparator CP1. The motor drive time calculating circuit 42 includes an OR gate 42a which receives the outputs of the inverting input AND gates 41e and 41f in the position shift detecting circuit 41, an NPN transistor Q2 to the base of which the output of the OR gate 42a is applied, a comparator CP2, resistors R2 through R5, and capacitors C2 and C3. In the motor drive time calculating circuit 42, the potential at the connecting point of the capacitor C2 and the resistor R2 connected to the collector or the transistor |Q2 is applied to the noninverting input terminal (+), of the comparator CP2, and a divided voltage Vb outputted by a voltage divider composed of the resistors R4 and R5 is applied to the inverting input terminal (−) of the comparator CP2. The direction-of-rotation discriminating circuit 43 comprises NOR gates 43a and 43b to first input terminals of which the outputs of the inverting input AND gates 41e and 41f in the position shift detecting circuit 41 are applied, respectively. The outputs of the NOR gates 43a and 43b are applied to first input terminals of respective inverting input AND gates 44a and 44b in the AND gate circuit 44. The output of the comparator CP2 in the motor drive time calculating circuit 42 is applied to the remaining second input terminals of the inverting input AND gates 44a and 44b.

The operation of the cornering lamp system thus constructed will be described.

It is assumed that the steering wheel is at the straight-ahead steering position, and the sub-reflector 5b is at the central position of its swing so that the illumination pattern of the headlamp 5 is directed forward of the vehicle. In this case, the count value of the up/down counter 32 is zero (0), and therefore a periodic pulse signal having a 50% duty ratio is provided, as a control signal for the servo motor control circuit 4, at the output terminal 3c of the control signal generating circuit 3. If the steering wheel is then turned clockwise, the count value of the up/down counter 32 is decreased in accordance with the amount of rotation of the steering wheel, and the voltage provided at the inverting input terminal of the comparator 34 by the D/A converter 33 is decreased in accordance with the count value of the up/down counter 32 thus decreased. Therefore, the pulse signal provided at the output terminal of the comparator 34, that is, the control signal applied to the servo motor control circuit 4 through the output terminal 3c of the control signal generating circuit 3, increases in duty ratio, and the pulse width of the control signal is increased with the amount of clockwise rotation of the steering wheel.

When the steering wheel is turned clockwise from the straight-ahead steering position, the control signal applied to the servo motor control circuit 4 is increased in duty ratio, and the pulse width of the control signal is increased as shown in part (a) of FIG. 5; that is, the pulse width W provided when the steering wheel is at the straight-ahead steering position is increased to W1. The control signal is applied to the position shift detecting circuit 41 in the servo motor control circuit. At the rise of the control signal (point in part (a) of FIG. 5) the base voltage of the transistor Q1 is set to the "L" level (low logic level—the point a in part (b) of FIG. 5), so that the transistor Q1 is rendered non-conductive. Because the transistor Q1 is nonconductive, the capacitor Cl is charged through the resistor R1, so that the potential at the connecting point P1 of the capacitor C1 and the resistor R1, i.e., the potential at the noninverting input terminal of the comparator CP1, is increased (point a in part (c) of FIG. 5). On the other hand, in this operation, the voltage provided at the inverting input terminal of the comparator CP1 through the potentiometer 47 (Va in part (c) of FIG. 5) has a value corresponding to the present angle of rotation of the electric motor 46 (2.5 V in this example). Therefore, when the potential at the connecting point P1, which is applied to the noninverting input terminal, exceeds the voltage Va provided at the inverting input terminal, the output of the comparator CP1 is raised to the "H" level (high logic level—the point b in part (d) of FIG. 5).

When the base voltage of the transistor Q1 is raised to the "H" level at the fall of the control signal shown in part (a) of FIG. 5 (point c in part (b) of FIG. 5), immediately the potential at the noninverting input terminal becomes substantially equal to ground potential (point c in part (c) of FIG. 5), and therefore the output of the comparator CP1 is set to "L" level (point c in part (d) of FIG. 5). That is, the output of the comparator CP1 is raised to the "H" level with a pulse width ΔW equal to the difference between the pulse width W1 of the control signal and the pulse width W provided when the steering wheel is at the straight-ahead steering position (ΔW=W1−W). The "H" level signal having the pulse width ΔW is provided at the output terminal of the inverting input AND gate 41e (part (h) of FIG. 5), thus being applied, as an amount of position shift between a target direction of illumination determined according to the steering angle and an actual direction of illumination, to the motor drive time calculating circuit 42 and the direction-of-rotation discriminating circuit 43.

Parts (e), (f), (g) and (i) of FIG. 5 show the outputs of the NOR gate 41b, inverter 41c, inverter 41d, and inverting input AND gate 41f, respectively.

The output of the inverting input AND gate 41e, which is applied to the motor drive time calculating circuit 42, is applied through the OR gate 42a to the base of the transistor Q2 (part (j) of FIG. 5). As a result, the transistor Q2 is rendered conductive for the pulse width ΔW, and therefore the capacitor C2 is discharged through the resistor R2, and the voltage at the noninverting input terminal of the comparator C2 is decreased (point b in part (k) of FIG. 5). When the voltage at the noninverting input terminal becomes lower than the output voltage (Vb in part (k) of FIG. 5) of the voltage divider composed of the resistors R4 and R5, the output of the comparator CP2 is set to the "L" level (point d in part 1 of FIG. 5). When the transistor Q2 is rendered nonconductive at the point c in part (j) of FIG. 5, the capacitor C2 is charged through the resistor R3, and the voltage at the noninverting input terminal of the comparator CP2 is gradually increased. When the voltage at the noninverting input terminal exceeds the divided voltage Vb at the inverting input terminal (point e in part (k) of FIG. 5), the output of the comparator CP2 is raised to the "H" level (point e in part 1 of FIG. 5). That is, the output of the comparator CP2 is maintained at the "L" level for a period of time τ corresponding to the pulse width ΔW which has been detected as an amount of position shift between a target direction of illumination determined from the steering angle and the actual direction of illumination. This output (position shift calculating signal) of the comparator CP2 is applied to the inverting input AND gates 44a and 44b in the AND gate circuit 44.

In the above-described embodiment, the charging time constant determined by the values of the capacitor C2 and the resistor R3 is larger than the discharge time constant determined by the values of the capacitor C2 and the resistor R2. It goes without saying that the period of time τ position shift calculating time) corresponding to the pulse width ΔW can be adjusted by changing the charge time constant and the discharge time constant.

Figure 6:
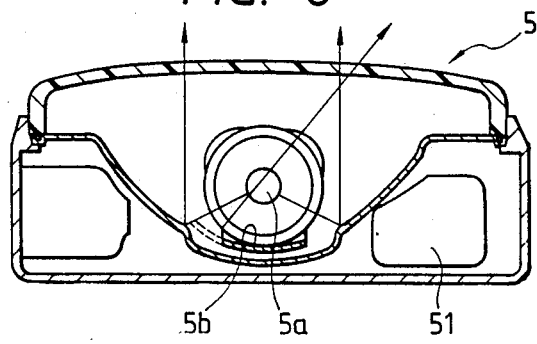
FIG. 6 is a sectional plan view of the headlamp shown in FIG. 2.

In the direction-of-rotation discriminating circuit 43, the outputs of the NOR gates 43a and 43b (parts (m) and (n) of FIG. 5) are changed to the "L" level and the "H" level, respectively, at the rise of the position shift detecting signal having a pulse width ΔW provided by the inverting input AND gate 41e in the position shift detecting circuit 41. The position shift calculating signal provided by the comparator CP2 a period of time $\tau_1$ after the change is outputted through the inverting input AND gate 44a (part (o) of FIG. 5). According to the "H" level position shift calculating signal outputted by the inverting input AND gate 44a, voltages at the output terminals 45a and 45b of the motor driver 45 are changed to the "H" level and the "L" level, respectively, from a "M" (middle) level (parts (q) and (r) of FIG. 5), as a result of which drive current is allowed to flow in the electric motor 46 in the direction of the arrow A (FIG. 4). Therefore, the output shaft 46a of the electric motor is rotated clockwise to turn the sub-reflector 5b (FIG. 2) so that the direction of illumination of the headlamp 5 is shifted to the right (the steering wheel turning direction) as viewed by the operator (see FIG. 6).

When the direction of illumination of the headlamp 5 is shifted to the right in the above-described manner, the voltage Va provided to the inverting input terminal of the comparator CP1 from the potentiometer 47 is increased according to the angle of rotation of the output shaft 46a of the motor 46, the pulse width ΔW of a position shift detecting signal obtained according to the next control signal outputted by the control signal generating circuit 3 is decreased, and the position shift calculating time τ corresponding to the pulse width ΔW is decreased. These operations are repeatedly carried out. When the pulse width ΔW of the position shift detecting signal becomes zero, the target direction of illumination will coincide accurately with the actual direction of illumination of the headlamp 5.

As the direction of illumination of the headlamp 5 approaches the target direction of illumination, the position shift calculating time τ is decreased, and the drive current supplied to the electric motor 46 is interrupted during a period of the control signal; that is, for every period of the control signal, the drive current is intermittently supplied only for the position shift calculating time τ. However, after interruption of the supply of drive current, the motor 46 continues to rotate due to inertial forces, and since the period of the control signal is short, the direction of illumination of the headlamp 5 will coincide with the target direction of illumination as if the sub-reflector turned linearly. In this operation, as the direction of illumination of the headlamp 5 approaches the target direction of illumination, the time during which the drive current is supplied is decreased, and the inertial force is also gradually decreased. As a result, overrunning of the motor 46 is prevented when the actual direction of illumination coincides with the target direction of illumination.

In the case where, on the other hand, the steering wheel is turned counterclockwise from the straight-ahead steering position, the count value of the up/down counter 32 is increased, and the voltage at the inverting input terminal of the comparator 34 increases with the increasing count value of the up/down counter 32, and therefore the duty ratio of the control signal applied to the servo motor control circuit 4 is decreased.

As the steering wheel is turned counterclockwise from the straight-ahead steering position, the duty ratio of the control signal is decreased, and the pulse width of the control signal decreases, as shown in part (a) of FIG. 7; that is, the pulse width W provided when the steering wheel is at the straight-ahead steering position decreases to W2. In this case, at the rise of the control signal, the transistor Q1 is rendered nonconductive, and the potential at the noninverting input terminal of the comparator CP1 is increased (point a1 in part (c) of FIG. 7). When the potential at the noninverting input terminal of the comparator CP1 exceeds the voltage Va provided at the inverting input terminal (point c1 in part (c) of FIG. 7), the output of the comparator CP1 is raised to the "H" level (point c1 in part (d) of FIG. 7) while the base potential of the transistor Q1 is raised to the "H" level (point c1 in part (b) of FIG. 7). Therefore, at this time instant, the transistor Q1 is rendered conductive, whereby the potential at the noninverting input terminal of the comparator CP1 becomes substantially equal to ground potential, and therefore the output of the comparator CP1 is set to the "L" level instantaneously.

The output of the inverting input AND gate 41f is raised to the "H" level at the fall of the control signal shown in part (a) of FIG. 7 (point b1 in part (i) of FIG. 7), and is set to the "L" level by the instantaneous "H" level output of the comparator CP1. That is, the output of the inverting input AND gate 41f is raised to the "H" level with a pulse width ΔW' equal to the difference between the pulse width W provided when the steering wheel is at the straight-ahead steering position and the pulse width W2 provided when the steering wheel is turned counterclockwise (ΔW'=W−W2). The "H" level signal having the pulse width ΔW' is applied, representative of an amount of position shift between a target direction of illumination determined according to a steering-wheel turning angle and an actual direction of illumination of the headlamp, to the motor drive time calculating circuit 42 and the direction-of-rotation discriminating circuit 43.

Upon reception of the position shift detecting signal having the pulse width τW', the motor drive time calculating circuit 42 forms a position shift calculating signal having a time width τ' corresponding to the pulse width ΔW' (part (1) of FIG. 7). On the other hand, in the direction-of-rotation discriminating circuit 43, the outputs of the NOR gates 43a and 43b (parts (m) and (n) of FIG. 7) are changed to the "H" level and the "L" level, respectively, at the rise of the position shift detecting signal. The position shift calculating signal provided a period of time τ1' after the change is outputted through the inverting input AND gate 44b (part (p) of FIG. 7). According to the "H" level position shift calculating signal outputted by the inverting input AND gate 44b, voltages provided at the output terminals 45a and 45b of the motor driver 45 are changed to the "L" level and the "H" level, respectively, from the "M" level (parts (q) and (r) of FIG. 7), as a result of which drive current is allowed to flow in the motor 46 in the direction of the arrow B for the position shift calculating time τ'. Therefore, the output shaft 46a of the motor 46 is rotated counterclockwise to turn the sub-reflector 5b so that the direction of illumination of the headlamp 5 is shifted to the left (the steering-wheel turning direction) as viewed by the operator.

When the direction of illumination of the headlamp 5 is shifted to the left in the above-described manner, the voltage Va provided at the inverting input terminal of the comparator CP1 by the potentiometer 47 is decreased with the angle of rotation of the output shaft 46a of the motor 46, the pulse width ΔW' of a position shift detecting signal obtained according to the next control signal outputted by the control signal generating circuit 3 is decreased, and the position shift calculating time τ' corresponding to the pulse width ΔW' is decreased. These operations are repeatedly carried out. When the pulse width ΔW' of the position shift detecting signal becomes zero, the target direction of illumination will coincide with the actual direction of illumination of the headlamp 5.

The operation of the cornering lamp system has been described with reference to the case where the steering wheel is turned clockwise or counterclockwise from the straight-ahead steering position. However, also in the case where the steering wheel is turned counterclockwise after being turned clockwise or vice versa, similarly, the direction of illumination of the headlamp 5 is linearly changed while following the steering angle.

As described above, with the cornering lamp system of the invention, the direction of illumination of the headlamp 5 can be linearly changed by the electric motor 46 whiel following the steering angle. Therefore, the cornering lamp system of the invention is simpler in arrangement than the conventional mechanical cornering lamp system, and one of the difficulties accompanying the conventional cornering lamp system, namely, that it is necessary to design different cornering lamp systems for different types of vehicles, is eliminated. Furthermore, since the cornering lamp system of the invention can be designed so that the operation of changing the direction of illumination of the headlamp 5 is effected only at night, the system has a much greater durability.

What is claimed is:

1. A vehicle cornering lamp system in which the direction of illumination of lamp means is changed in association with a steering-wheel turning operation, comprising:
    control signal generating means for periodically generating a control signal having a pulse width corresponding to a steering angle;
    position shift detecting means for detecting an amount of position shift between an actual direction of illumination of said lamp means and a target direction of illumination determined from said steering angle as indicated by said control signal provided by said control signal generating means;
    an electric motor for setting said direction of illumination of said lamp means; and
    direction-of-illumination changing means for driving said electric motor to change said direction of illumination of said lamp means so that said amount of position shift becomes zero.

2. The vehicle cornering lamp system of claim 1, wherein said control signal generating means comprises: means for producing first and second pulse signals indicative of rotation of the steering wheel in respective directions; an up/down counter receiving said first and second pulse signals on respective up and down count input terminals; a digital-to-analog converter having an input coupled to a count output of said counter; a sawtooth waveform generator; and a comparator having respective comparison inputs coupled to outputs of said digital-to-analog converter and said sawtooth waveform generator.

3. The vehicle cornering lamp system of claim 1, further comprising: a potentiometer having an input shaft coupled to an output shaft of said electric motor for producing a signal indicative of the actual direction of illumination of said lamp means, said position shift detecting means operating in response to said control signal and said signal indicative of the actual direction of illumination for producing a pair of signals indicative of amounts of deviation of said actual direction of illumination from said target direction of illumination in respective opposed directions; motor drive time calculating means operating in response to said pair of signals for producing a signal indicative of a drive time of said electric motor; drive circuit means having a pair of input terminals for driving said electric motor in opposed directions as indicated by signals applied to said input terminals; and gating means for applying said signal indicative of a drive time of said motor to one of said pair of input terminals of said drive circuit means indicated by said pair of signals indicative of amounts of deviation of said direction of illumination.

* * * * *